United States Patent [19]

Bradshaw

[11] 4,284,236

[45] Aug. 18, 1981

[54] AIR CONDITIONING SYSTEM

[75] Inventor: Norman F. Bradshaw, Richmond, England

[73] Assignee: Carrier Drysys Limited, London, England

[21] Appl. No.: 906,749

[22] Filed: May 17, 1978

[51] Int. Cl.³ .............................................. F24F 7/00
[52] U.S. Cl. ................................... 236/49; 98/115 R
[58] Field of Search ..................... 236/49, 78 C, 78 D; 98/115 R; 126/299 C; 318/610

[56] References Cited

U.S. PATENT DOCUMENTS

| | | | |
|---|---|---|---|
| 3,072,268 | 2/1978 | Perris | 236/78 C |
| 3,628,129 | 12/1971 | Riley | 323/100 |
| 3,682,381 | 8/1972 | Eckman et al. | 236/49 X |
| 3,725,762 | 4/1973 | Levesque | 318/609 X |
| 3,778,025 | 12/1973 | Lane et al. | 236/78 D |
| 4,086,781 | 5/1978 | Brody et al. | 236/49 |

OTHER PUBLICATIONS

Control Systems for Heating, Ventilating & Air Conditions, R. W. Haines, 1971, Van Nostrand Reinhold Co.

*Primary Examiner*—William E. Wayner
*Attorney, Agent, or Firm*—Krass, Young & Schivley

[57] ABSTRACT

An air conditioning system comprises sensor means arranged at a location for sensing the air condition at said location, and air delivery means arranged at the location, the air delivery means being responsive to the sensor means to deliver air to the location in accordance with the prevailing air condition. The system is particularly useful in a building having a plurality of locations. In this case, separate sensor means and an associated air delivery means are arranged at each location so that a controlled air supply can be delivered to each location in accordance with the air condition at that location and independently of the air condition at the other locations.

5 Claims, 7 Drawing Figures

AIR CONDITIONING SYSTEM

FIELD OF THE INVENTION

The present invention relates to an air conditioning system, for example for controlling the environment in factories and workshops.

Not infrequently industrial processes give rise to heat, fume and/or noise and sometimes odour. More particularly, these environmental pollutants are likely to be intermittent, as, for example, when a welding process begins, hot castings are removed from their moulds, or stoved car bodies emerge from curing ovens.

DISCUSSION OF PRIOR ART

The usual method of dealing with fumes is to provide a number of roof openings in the form of high level windows or cowls or, where the pollution is more intense, ducted and fan assisted extracts in the roof of the factory or other workplace. It is commonplace for factory roofs to be fitted with a substantial number of extract fans. The quantity of air which is relieved from the roof will be replaced, either intentionally or haphazardly by entering at the low level through doorways and various apertures and in some instances, by some form of fan assisted air supply system.

One of the common forms of air supply is the high level fan blower, the more sophisticated of which have a connection to the outside usually through the roof of the building and some form of heater battery, powered either by steam or hot water or electricity, which is intended to blow warm air down to floor level to provide a degree of comfort. The location of the fan blowers at high level is one of expediency so that they are not in the way of the process. However, this technique is inherently unsatisfactory where fume and the like occur because the pollutants accummulate under the roof and the air blown downwards blows the pollutants towards the personnel at work. Similarly, if the high level fan blowers are used in summer to supply cool air to the personnel they will tend to blow the heat accummulating under the roof to the personnel.

It will thus be seen that the present systems are not entirely successful in keeping the air in a factory clean and at an appropriate temperature. In addition, the conditions at particular working locations can be very unpleasant. Thus, if a worker is standing adjacent a floor-type conveyor to manipulate machinery, for example, to remove a hot casting from its sand mould, or to tap a steel furnace involving the issue of molten metal, the worker will suffer an immediate and very unpleasant feeling of heat. Attempts have been made to regulate the supply of air to such locations to make the working temperature at the location more pleasant. Conventionally air supplies are regulated by means of some form of thermostat which may be located either in the factory or in a return air outlet. The thermostat is arranged to respond to an increase in air temperature and thereafter readjust the supply temperature to compensate. Unfortunately in rapid intermittent industrial process this degree of response is inherently too late and the worker, as a result, may be subjected to alternate draughts of hot and cold air.

SUMMARY OF THE INVENTION

It is an object of the present invention to provide an air conditioning system, for example for use in factories, which can provide a controlled air supply at the or each working location.

According to the present invention an air conditioning system comprises means for monitoring the air condition at at least one location, and means responsive to the said monitoring means to deliver air to said location.

As air is delivered to the said location in response to the air condition monitored at that location it is possible to ensure that the temperature at the location is kept relatively stable. In addition if it is found that the air at the location contains fume or other atmospheric pollutants it is possible to increase the volume of air supplied to the location to clean the air at that location. In addition, to more easily deal with fume and other pollutants, the system preferably comprises means at the said location to contain and extract air flow. In this way, the fume and pollutants can be directed to an output device and replaced with clean air by said delivery means. To make this process more efficient means are preferably provided to confine the working location so that the air flow therethrough is precise and rapid.

In an embodiment, said monitoring means comprises one or more sensors each arranged to produce an output signal dependent upon the air condition at said location. Said air delivery means may comprise means for varying the volume and/or velocity of the air delivered in dependence upon the output signal or signals from the sensor(s). For example, said means for varying the volume and/or the velocity of the air may comprise at least one adjustable throttle valve and means for adjusting the position of the throttle valve. Further, said air delivery means may comprise means for varying the temperature of the air delivered in dependence upon the output signal or signals from the sensor or sensors. For example, said means for varying the temperature could comprise at least one heat exchanger and means for adjusting the flow of a heat exchange medium therethrough.

Preferably, the or each sensor is arranged to produce an electrical output signal and an electrical control circuit is associated with each said adjusting means to operate the adjusting means in accordance with the output signal from one or more sensors. Such a control circuit is connected to receive the output signal or signals and comprises one or more comparators each connected to the output of a respective associated sensor and each arranged to compare the output of the sensor with a respective reference level, and a driver circuit arranged to operate said adjusting means in dependence upon the output signal or signals from the comparator or comparators. In addition, the control circuit may comprise a rate of change detector connected to receive the output signal from one associated sensor a further comparator connected to the output of said detector and arranged to compare the rate of change of the output signal with a reference level, and a direction amplifier connecting said further comparator to said driver circuit.

In an embodiment, said air delivery means comprises a housing defining at least one air diffusion chamber therein, the housing having one wall facing said location, an inlet manifold connected for delivering air into said chamber in said housing, and a plurality of adjustable dampers mounted in an opening in said one wall whereby air can be delivered to said location through said opening and controlled by said dampers.

Preferably a throttle valve is mounted in said manifold and connected to an actuator arranged to adjust the position of said throttle valve in response to said monitoring means. Further, a heat exchanger may be mounted in said manifold and connected to a circuit for circulating a heat exchange medium therethrough, said circuit including means for adjusting the flow of the heat exchange medium in response to said monitoring means.

In an alternative embodiment, two or more diffusion chambers are defined within said housing, each said chamber communicating with a respective part of said opening, and wherein each said diffusion chamber communicates with a respective passage formed in said inlet manifold. A throttle valve is mounted in each said passage, each throttle valve being connected to a respective actuator arranged to adjust the position of the throttle valve in response to said monitoring means. Further, a heat exchanger is mounted in each said passage, each heat exchanger being connected to a respective circuit for circulating a heat exchange medium therethrough, each circuit including means for adjusting the flow of the heat exchange medium in response to said monitoring means.

In a preferred embodiment of the invention monitoring means are provided at each of a plurality of locations and air delivery means, responsive to the associated monitoring means, are also provided at each location.

Preferably, separate means are provided at each location to contain and extract air flow.

It will thus be seen that at each location air can be delivered in accordance with the conditions at that location. Thus, cool air can be delivered to locations at which hot air is generated and clean air can be delivered to locations at which fume or other pollutants are generated. Similarly, hot air can be directed to any location at which the temperature falls below a predetermined value.

Preferably the means at each location for extracting air flow are connected together and to a common output extraction device. In addition, a common input air delivery device can be connected to each delivery means. A feed back path between the output extraction device and the input delivery device can be provided so that heat from the extracted air can be used to heat the air being delivered to selected locations. The feed back may be a direct feed back of hot air or a secondary medium may be used to transfer the heat from the output device to the input device.

The monitoring means at the or each location may comprise an infra-red thermometer to recognise the direction and intensity of heat. Such a thermometer can be arranged to control the velocity, and/or the volume, and/or the temperature of air delivered to the associated location. Alternatively, or in addition, opacity sensors or hydro-carbon analyzers can be directed at each working location to recognise the development of fume or other unseen pollutants respectively. Again, the sensors can be arranged to readjust the velocity, and/or the temperature, and/or the volume of the air supplied.

In a preferred embodiment, a control device is provided at each location and arranged to control the velocity, and/or the volume, and/or the temperature of the air delivered. This control device is arranged to be responsive to the infra-red thermometer and/or the opacity sensor. For example, the control device at each location may comprise a temperature control device responsive to the infra-red thermometer and a volume control device responsive to the opacity sensor. The control device at each location can be totally automatic.

BRIEF DESCRIPTION OF THE DRAWINGS

Embodiments of the present invention will hereinafter be described, by way of example, with reference to the accompanying drawings, in which.

DESCRIPTION OF PREFERRED EMBODIMENTS

Figure 1:
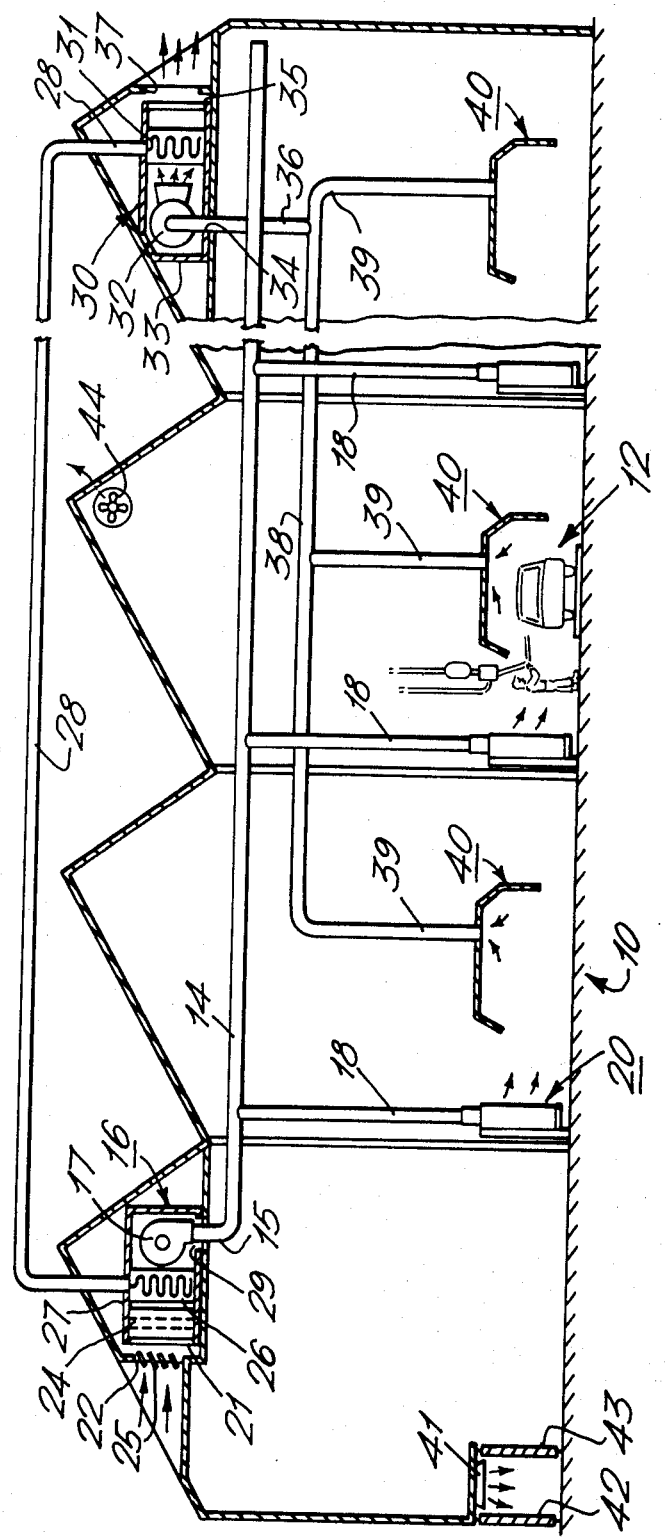
FIG. 1 shows schematically a longitudinal section through a factory building providing several working locations and illustrates an embodiment of an air conditioning system of the invention installed in the building.

FIG. 1 shows schematically a longitudinal section through a factory, workshop or other workplace building 10 having therein a plurality of individual working locations 12 of which only one is shown in detail. A controlled air delivery system for each working location comprises a delivery pipe 14 conveniently fixed in the roof space of the factory building and running longitudinally along the whole length of the factory building. A plurality of branch input pipes 18 each extend from the delivery pipe 14 to a respective one of the working locations 12. Each input pipe 18 is arranged to deliver clean air at a predetermined temperature to an environmental control device 20 which will be described in more detail hereinafter.

The inlet end 15 of the delivery pipe 14 is connected to receive clean air at the predetermined temperature from an air conditioning unit, generally referred to by numeral 16, which is conveniently mounted in the roof space adjacent an opening 22 formed in the roof. In the illustrated embodiment, a plurality of adjustable dampers 25 are also mounted across the opening 22 for manual or automatic control of the air flow through the opening 22 and to prevent the ingress of larger dust particles. The unit 16 has a housing 27 which is mounted in the roof space so that the open, inlet end 21 thereof is adjacent the opening 22. A filter or dust extractor 24 is mounted in the housing 27 and extends across the inlet end 21. A heat exchanger 26 is mounted in the housing 27 between the filter 24 and an input fan 17. The input fan 17 is arranged to draw air from the opening 22 through the filter 24 and across the heat exchanger 26 and to deliver the air to a discharge opening 29 provided in the housing 27. The inlet end 15 of the air delivery pipe 14 is connected to the discharge opening 29. If required, the heat exchanger may be replaced by an electric heater. Additionally, or alternatively, the input fan 17 may include an air heater in conventional manner. If required, the housing 27 may also include an air cooler and/or humidifier (not shown).

The air conditioning unit 16 as described is conventional and is used in the normal manner to discharge clean air at a predetermined temperature, and if required, at a predetermined humidity, through its discharge opening 29, and hence to the delivery pipe 14.

In the embodiment illustrated in FIG. 1, the heat exchanger 26 receives heat from a fluid medium within a feed back pipe 28 which connects the heat exchanger 26 with a heat exchanger 31 of an output air handling unit 30. The unit 30 comprises a housing 33 mounted in the roof space so that the open discharge end 35 thereof is adjacent an opening 37 in the roof. The heat exchanger 31 is mounted in the housing 33 adjacent an output extraction fan 32 mounted to draw air through an inlet opening 34 of the housing 33. The inlet opening 34 is connected to the outlet end 36 of an air output pipe 38 which extends along the length of the building, preferably in the roof space. The output air handling unit may comprise any conventional air conditioning unit and may include a dehumidifier, a cooler and/or a filter so that the condition of the air discharge to atmosphere through the opening 37 in the roof does not cause pollution. If required, adjustable dampers (not shown) may be mounted across the opening 37 in the roof to control the exit of air.

The air output pipe 38 connects with a plurality of extraction pipes 39 which each extend to a respective working location 12. In the embodiment illustrated, each extraction pipe 39 is connected to a respective metal tunnel member 40 of substantially inverted U-shaped cross-section arranged at each working location. The tunnel member 40 is arranged at each working location so as to substantially confine the working process without interfering with the process.

The factory building is preferably provided with controlled air entry at doorways. For example, each entrance to the building may be provided with two spaced doors, as at 42 and 43 defining an air lock. Furthermore, a conventional downflow fan convector, schematically indicated at 41, can be mounted on the ceiling of the air lock and arranged to provide a warm air curtain therein. In addition, a minimal number of conventional roof extracts, as 44, may be provided in the roof to clear any remaining heat and/or fume.

Figure 2:
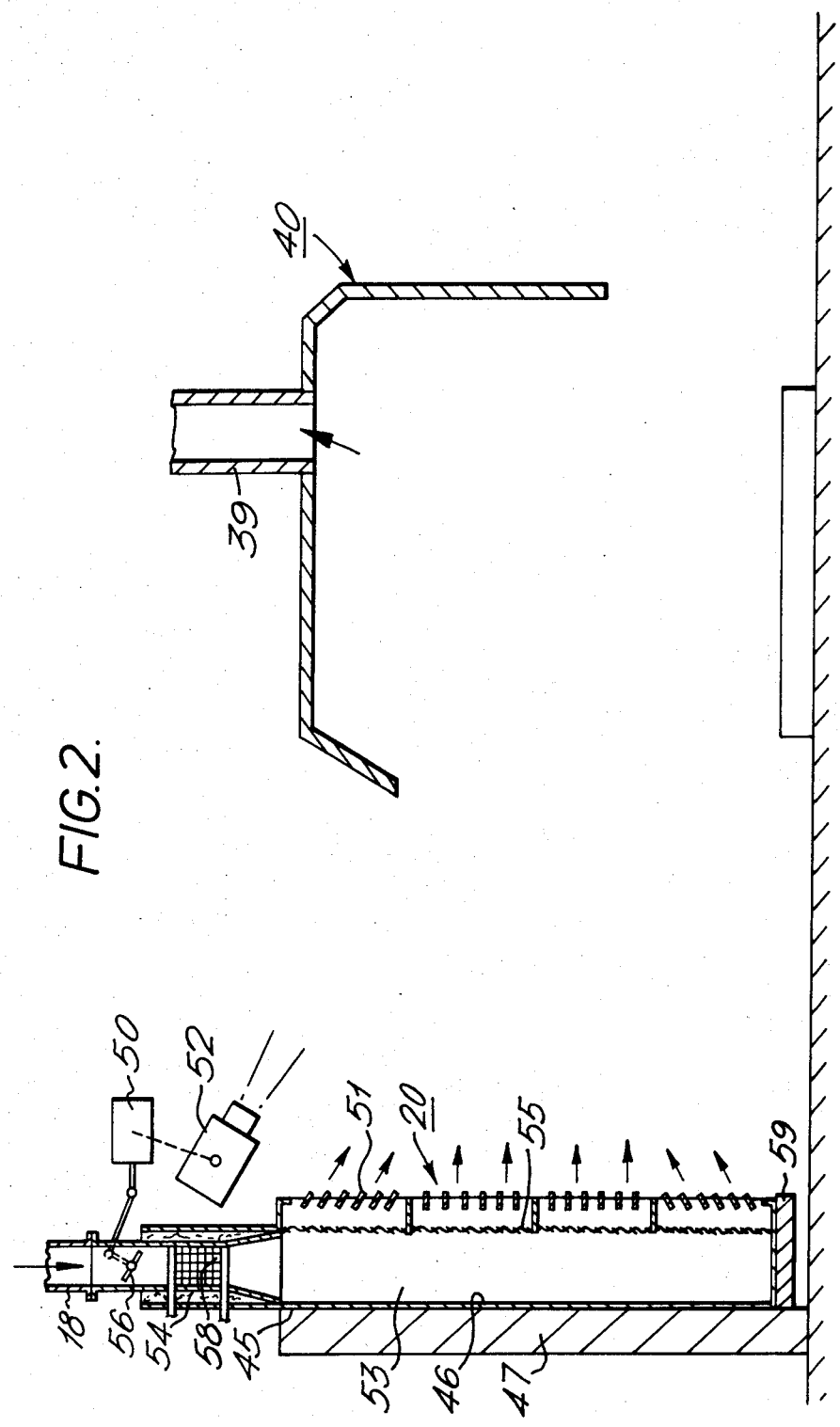
FIG. 2 shows an enlarged view of one working location of the building of FIG. 1 and illustrates a vertical section through an embodiment of an environmental control device provided at the location.

The arrangement at one working location is shown more clearly in FIG. 2 in which the tunnel member 40 is shown to be positioned over the working location to contain fumes and guide them to the extraction pipe 39. At each working location, the air supply pipe 18 is connected to the environmental control device 20, which in the illustrated embodiment is arranged to deliver air to the working location and to form an acoustic and environmental barrier.

Figure 3:
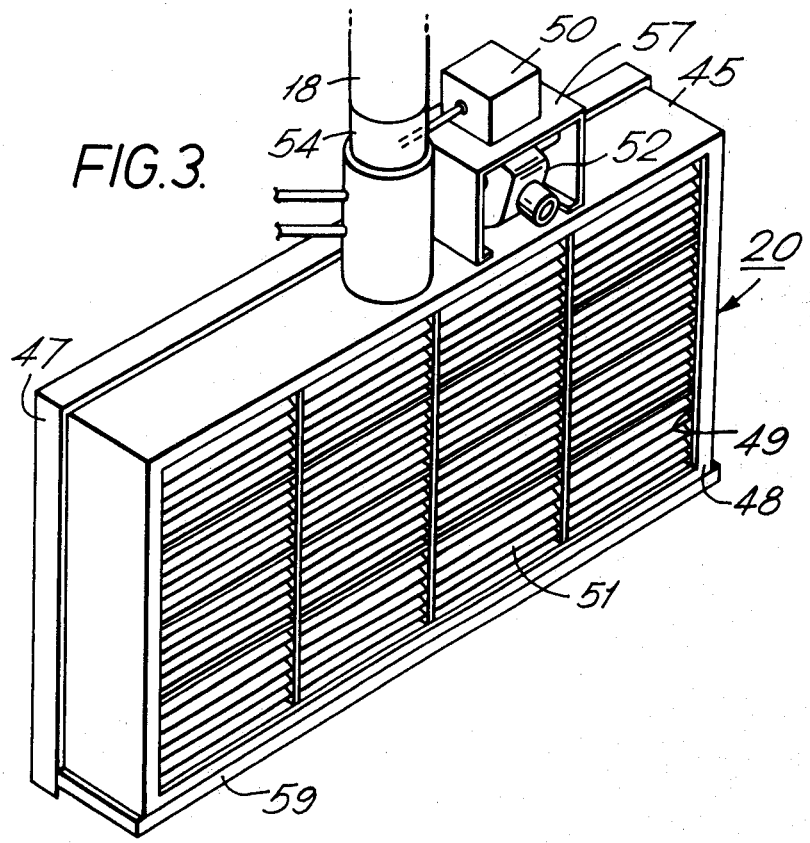
FIG. 3 shows a perspective view of the environmental control device of FIG. 2 and also illustrates an embodiment of the mounting of an actuator and a sensor associated with the device.

FIG. 2 shows a vertical section of the environmental control device 20, whilst FIG. 3 illustrates a perspective view of the control device 20 showing the mounting of an associated actuator 50 and a sensor 52 thereon.

As can be seen from FIGS. 2 and 3 the environmental control device 20 comprises a substantially rectangular shaped housing 45, preferably made of galvanised sheeting, having a rear wall 46 remote from the working location 12. The rear wall 46 is mounted on an acoustic panel 47, for example, by bolts (not shown). The acoustic panel 47, which may be of any suitable construction, extends substantially transversely of the working location 12 to separate the working location 12 from an adjacent working location and to restrict the passage of noise from one working location to the adjacent working location. In the embodiment illustrated the housing 45 is supported by the acoustic panel. However, the housing 45 may be self-supporting or may be supported by other structures within the building. The front wall 48 of the housing 45, that is, the wall which faces the working location, has an opening 49 provided therein in which a plurality of adjustable louvres 51 are mounted. Preferably, the louvres 51 are arranged in banks both horizontally and vertically of the opening 49 so that the louvres of each bank may be adjusted separately, either manually or automatically. In this way, air may be directed through the opening 49 by the louvres 51 as required towards the working location. The rear wall 46 and the front wall 48 define between them a diffusion chamber 53. This diffusion chamber 53 is in communication with an inlet manifold 54 and with the opening 49. A fine mesh screen or perforated plate 55 is arranged in the chamber 53 adjacent and substantially parallel to the opening 49 to diffuse the air flowing therethrough. The inlet manifold 54 is connected to a respective input pipe such that air can flow from the input pipe 18 via the manifold 54 to the diffusion chamber 53. The internal cross-sectional area of the inlet manifold 54 increases towards the diffusion chamber 53 to enable air to flow to all parts of the chamber 53. The air flow is controlled by way of a butterfly valve 56 arranged within the manifold 54. The position of the butterfly valve 56 is adjusted by means of the actuator 50 which is responsive to the sensor 52. In the embodiment illustrated in FIG. 3 the actuator 50 is supported on a bracket 57 of substantially inverted U-shape affixed to the top of the housing 45 of the control device 20. The sensor 52 is pivotally mounted within the bracket 57 so that it can be directed towards the working location. However, the actuator 50 and sensor 52 can of course be supported within the building as required.

The sensor 52 may be a temperature sensor, an opacity sensor to detect fume, another pollutant sensor, or a combination of each type of sensor. Thus, the sensor 52 may be an infra-red thermometer, for example, of the type IT-3 distributed by B & K Instruments Ltd. Alternatively, the sensor 52 may be an opacity sensor, for example, of the RM series produced by Irwin Sick, Optic-Electronic Ltd. Alternatively, the sensor 52 may be a hydro-carbon analyzer, for example, of the type produced by IPM GmbH, to detect unseen atmospheric pollutants. All of these types of sensors produce an electrical output signal dependent upon the condition of the atmosphere sensed. This electrical output signal is fed to the actuator 50 by way of a programmer (not shown) which may be similar to the programmer 162 or 262 shown in FIGS. 6 and 7 and described in more detail hereinbelow. The actuator 50 may be a damper motor, for example, of the type produced by Stafa Control systems. The actuator 50 is arranged to produce continuous or step-wise adjustment of the position of the butterfly valve 56 in dependence upon the output signal of the sensor 52.

The inlet manifold 54 encloses a heat exchanger 58 which, as shown, is a finned tube heat exchanger. The fluid within the heat exchanger 58 can be used to cool or heat the air flowing thereover as required. The heat exchanger 58 could be automatically controlled, for example, by an additional temperature sensor (not shown) fastened on the front wall 48 of the housing 45, or by other means. Alternatively, electrical heating means could be provided in the inlet manifold 54 or in the diffusion chamber 53 if required.

As the air in the diffusion chamber 53 will generally be at a temperature which differs from the temperature of the air surrounding the control device 20, a strip 59 of insulating material is arranged externally, longitudinally along the base of the housing 45.

In use, the input fan 17 of the air conditioning unit 16 and the output extraction fan 32 of the output air handling unit 30 are switched on. The air conditioning unit 16 is arranged to supply clean air at a predetermined temperature to the delivery pipe 14 and hence to the input pipes 18. At each working location the sensor 52 is arranged to sense the air conditions at that working location. If the sensor 52 is an opacity sensor or a hydrocarbon analyzer and detects a high level of fume or of unseen atmospheric pollutants it supplies an output signal to cause the actuator 50 to open the throttle valve 56 in the respective inlet manifold 54. This increases the volume of air supplied by way of the chamber 53 and the opening 49 to the working location. Similarly, if an infra-red sensor at the working location detects a high level of heat the throttle valve 56 can again be opened to admit a high volume of cool air. At the same time fume, hot air, and any other pollutants generated at the working location by the process tend to be confined within the tunnel member 40 and are extracted through the extraction pipe 39 and the air output pipe 38 by the action of the extraction fan 32. The speed of the extraction fan 32 can be varied, if required in dependence upon the signals from the sensor 52, to maintain an equalibrium between the air delivered to the location and the air extracted therefrom. In this way a fresh clean air supply is delivered to the working location to keep the air at this location cool and to rid the air at the working location of fume and other pollutants. If there is no heat generated at the working location, and the ambient temperature is cool the heat exchanger 58 within the manifold 54 and/or the heat exchanger 26 within the air conditioning unit 16 can be operated to heat the air delivered to the working location.

The heat in the extracted air delivered to atmosphere by the extraction fan 32 can be recovered by way of the heat exchanger 31 within the air handling unit 30 and used to heat the fluid contained in the feed back pipe 28. This heat can be used for any purposes required, but in the embodiment shown is fed to the heat exchanger 26, to heat the air delivered to the input pipes 18 by the input fan 16. It will be seen that the air delivered to the input pipes 18 is clean as it passes through the dust extractor or filter 24 and is obtained through the dampers 25 from the relatively clean atmosphere outside the building. The air delivered by the extraction fan 32 to atmosphere is preferably delivered through a dust extractor or filter or other cleaning means (not shown) to avoid polluting the atmosphere.

In the embodiment illustrated in FIG. 1, the feed back pipe 28 is shown to extend above the roof of the building 10. Of course, the pipe 28 can extend within the roof space. Furthermore, the pipe 28 is generally lagged or otherwise heat insulated to prevent appreciable heat loss or heat gain by the fluid medium therein. Generally, the heat exchangers 26 and 31 would be connected by two pipes as 28, or by a coaxially arranged pipe to ensure circulation of the fluid medium. A circulating pump (not shown) could also be provided.

Figure 4:
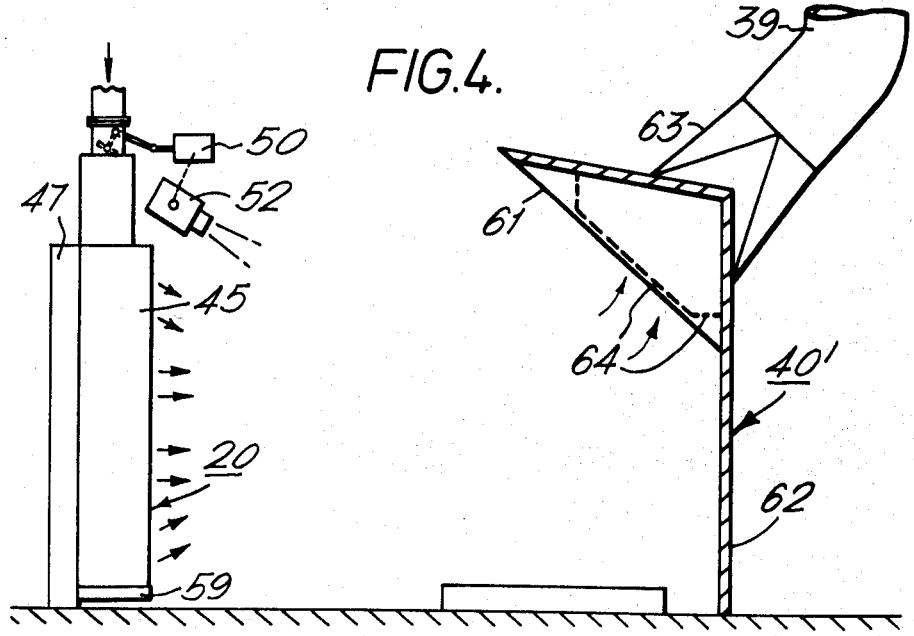
FIG. 4 shows a view similar to that of FIG. 2 of a working location showing an alternative embodiment of a tunnel member.

FIG. 4 shows schematically a working location 12 and illustrates an alternative embodiment of a tunnel member 40'. This tunnel member 40' comprises a substantially triangular metal hood 61 supported on a metal column 62. Generally, the hood 61 is constructed of galvanised sheeting and is connected to a respective extraction pipe 39 by way of a metal section member 63. Preferably, adjustable openings 64 are provided in the hood 61 so that the hood can be arranged to give optimum fume removal and to maintain equilibrium between the air delivered to the location and air extracted therefrom. The embodiment of the tunnel member 40' shown in FIG. 4 affords clearance for tools, cranes and the like employed at the working location.

Figure 5:
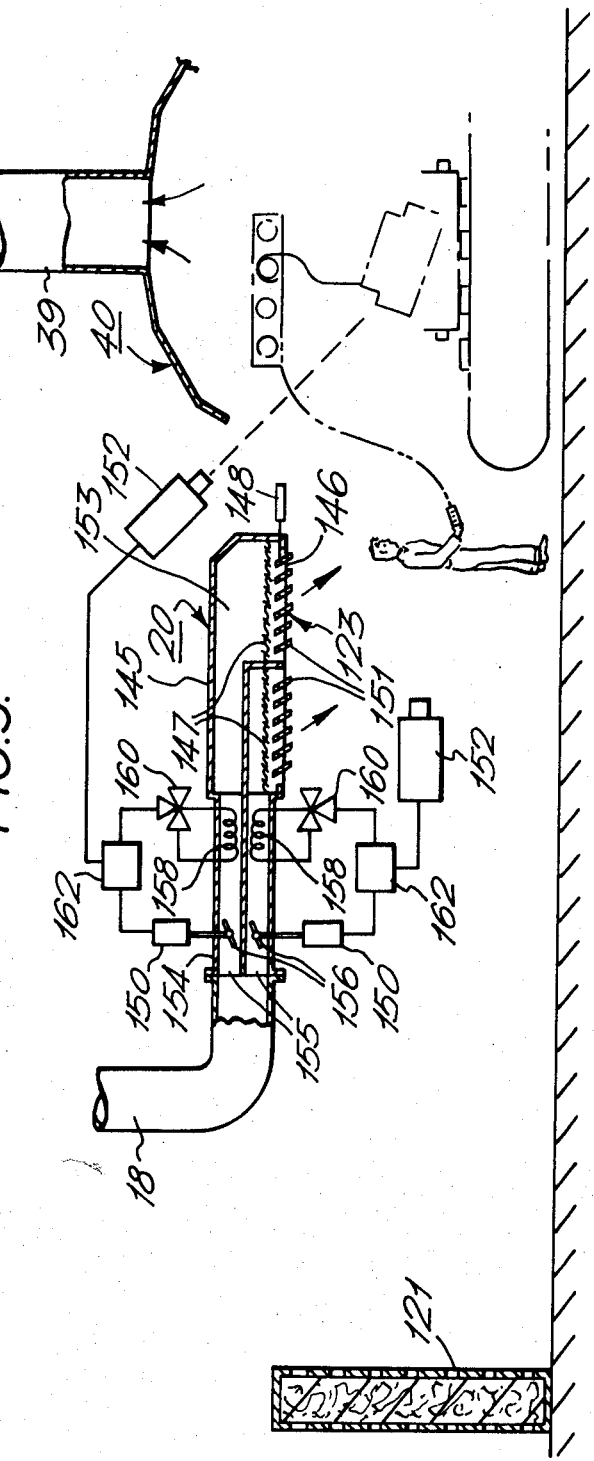
FIG. 5 shows schematically one working location and illustrates a vertical section through a further embodiment of an environmental control device.

FIG. 5 shows the arrangement at one working location of a further embodiment of an air conditioning unit. In the embodiment shown in FIG. 5 the working location is illustrated as one at which hot castings are removed from the sand moulds. In such a process the operator manipulates some form of control mechanism which causes the casting to be lifted clear of the casting box and sand. The exposed casting radiates a substantial amount of heat towards the operator. As illustrated in FIG. 5 the tunnel member 40 is arranged at the working location so that convective heat and fume from the hot casting are substantially confined thereby and can be extracted through the extraction pipe 39 by way of the output extraction fan.

It will be seen that the environmental control device 20 arranged at the working location includes an air diffusion and delivery device 123. In this embodiment, the air delivery device 123 is arranged to distribute air over the operator at the working location. In addition, an acoustic enclosure barrier 121 extends transversely of the working location to restrict the passage of noise from the working location to adjacent locations. Preferably, the barrier 121 is formed from a metal housing having two spaced walls extending transversely of the working location. Said two spaced walls are perforated and support therebetween a mineral wool filling. In an embodiment, the barrier 121 is formed from a plurality of interlocking panels.

The air delivery device 123 is shown in section in FIG. 5. It will be seen that an air intake manifold 154, which is connected to a respective air input pipe 18, is divided into two passages 155 each enclosing a respective throttle valve 156 connected to a respective actuator 150. Each passage 155 opens into a respective diffusion chamber 153 within a housing 145 of the air delivery device 123. The housing 145 has a wall 146 extending above the working location which is open and in which a plurality of adjustable louvres 151 are mounted. It will be seen that each diffusion chamber 153 communicates with a respective portion of the wall 146. A respective adjusting mechanism 148 is provided for the plurality of adjustable louvres 151 in each portion of the opening of the wall 146 so that the air flow from each diffusion chamber 153 can be independently controlled and directed. Each adjusting mechanism 148 can be arranged to be adjusted either manually or automatically. A fine mesh grid or perforated plate 147 extends in each diffusion chamber 153 across the opening in the wall 146 to diffuse the air flowing therethrough. A heat exchanger 158, preferably of a finned tube construction, is mounted in each passage 155 to heat or cool air flowing thereover.

Each throttle valve 156 is adjustable by way of the respective actuator 150, which may be a damper motor of the type identified above. Each actuator 150 operates in response to a respective sensor 152 which may be an infrared thermometer or an opacity sensor of the types identified above. The flow of fluid through each heat exchanger 158 is controlled by way of a respective fluid control valve 160. The actuator 150 and fluid control valve 160 associated with one diffusion chamber 153 are both controlled by a programmer 162 which is responsive to the output signal from the associated sensor 152.

In an embodiment, the sensor 152 associated with one diffusion chamber 153 is an infra-red thermometer, whilst the sensor 152 associated with the other diffusion chamber 153 is an opacity sensor. In another embodiment, an opacity sensor is arranged to control both fluid control valves 160 and an infra-red thermometer is arranged to control both actuators 150.

In the embodiment illustrated in FIG. 5 each programmer 162 receives signals from both an opacity sensor and an infra-red sensor.

Figure 6:
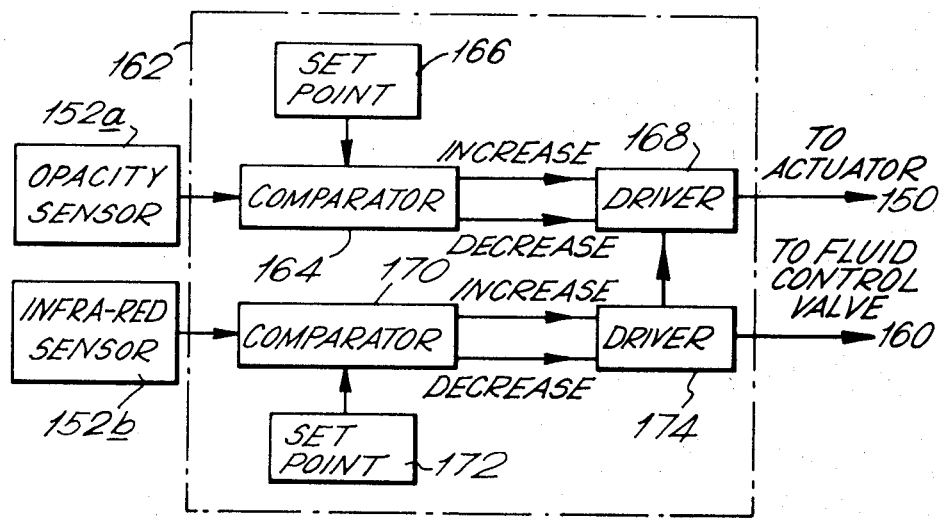
FIG. 6 shows a block diagram of an embodiment of a programmer for use with an environmental control device of the air conditioning system.

FIG. 6 shows a block diagram of a circuit for a programmer 162 associated with one of the diffusion chambers 153. A similar programmer 162 is provided for the other diffusion chamber. The programmer 162 is connected to receive the electrical output signals from an opacity sensor 152a and from an infra-red sensor 152b. These sensors 152a, 152b are suitably mounted with respect to the working location. The output from the sensor 152a is fed to an analogue comparator 164. The other input to the comparator 164 is a reference level from a pre-set adjustable level indicator 166. The comparator 164 has two outputs, one indicating that the sensor output signal is greater than the pre-set reference level and the other indicating that the sensor output signal is less than the pre-set level. Both outputs from the comparator 164 are fed to a driver circuit 168 for the actuator 150. Similarly, the output from the sensor 152b is fed to a further analogue comparator 170. The other input to the comparator 170 is a reference level from a preset level indicator 172. The comparator 170 likewise has two outputs one indicating that the sensor output signal is greater than the reference level and the other indicating that the output signal is less than the reference level. The outputs from the comparator are fed to a driver circuit 174 arranged to control the fluid control valve 160. A second output from the driver circuit 174 is also connected to the driver circuit 168 for the actuator 150.

In operation, the opacity sensor 152a and infra-red sensor 152b are positioned to monitor the environmental conditions at a working location. Thus, when the infra-red sensor 152b, "sees" the radiant heat emitted by an exposed casting it applies an output signal, whose magnitude depends on the temperature, to the comparator 170. The comparator 170 generates an output signal indicating that the sensor output signal is greater than the pre-set level and the driver circuit 174 actuates the fluid control valve 160 to increase the flow of fluid through the heat exchanger 158 so that the air flowing thereover is cooled. Further, the output signal applied by the driver circuit 174 to the driver circuit 168 causes operation of the actuator 150 to increase the volume of air flowing through the inlet manifold passage 155 and hence to the working location. If, at the same time, the opacity sensor 152a likewise "sees" an increase in fume or smoke, the driver circuit 168 will be effective to increase the volume of air flow still further by way of the actuator 150 in a similar manner. If now, the sensors 152a and 152b detect a lowering of the temperature and a decrease in the amount of fume due to the volume of cool air which has been fed by the delivery device 123 to the working location, the comparator 170 produces an output signal indicating that the output signal from the infra-red sensor is less than the reference level whilst the comparator 164 generates an output signal indicating that the output signal from the opacity sensor is less than the reference level. The throttle valve 156 is thus adjusted to decrease the volume of air flow and the fluid control valve 160 is adjusted to decrease the flow of cooling liquid through the heat exchanger 158. The circuit shown in FIG. 6 constantly operates to maintain a suitable environment at the working location in dependence upon the pre-set reference levels of the indicators 166 and 172.

The components shown in the circuit of FIG. 6 are conventional and are not further described. It will be appreciated that the heat exchangers 158 are connected into a suitable cooling fluid circulation circuit which is not illustrated.

The operation described above is illustrated by reference to processes generating heat at the working location so that the heat exchangers 158 are arranged to cool the air delivered to the working location. Of course, if the processes produce cooling at the working location the heat exchangers 158 can be arranged to heat the air at the working location.

In the embodiment described with reference to FIGS. 5 and 6 the programmers 162 supply signals for the actuation of the throttle valves 156 and of the fluid control valves 160. Additionally, or alternately, the programmers 162 could also be arranged to supply signals for operating the actuating mechanisms 148 of the louvres 151.

In the programmer 162 shown in FIG. 6 the driver circuit 174 is arranged to apply an output signal to the driver circuit 168. However, if required, each channel of the programmer 162 may be arranged to operate independently. Hence, the driver circuit 168 could be arranged to cause operation of the actuator 150 solely in dependence upon the output signal from the opacity sensor 152a, and the driver circuit 174 could be arranged to cause operation of the fluid control valve 160 solely in dependence upon the output signal from the infra-red sensor 152b.

It will also be appreciated that in an embodiment, not illustrated, the or each sensor could be connected to a respective control circuit comprising a comparator, a reference level indicator, and a driver circuit. In this embodiment, the or each driver circuit would be arranged to cause operation of adjustable means, such as, an actuator or fluid control valve, associated with the environmental control device.

Figure 7:
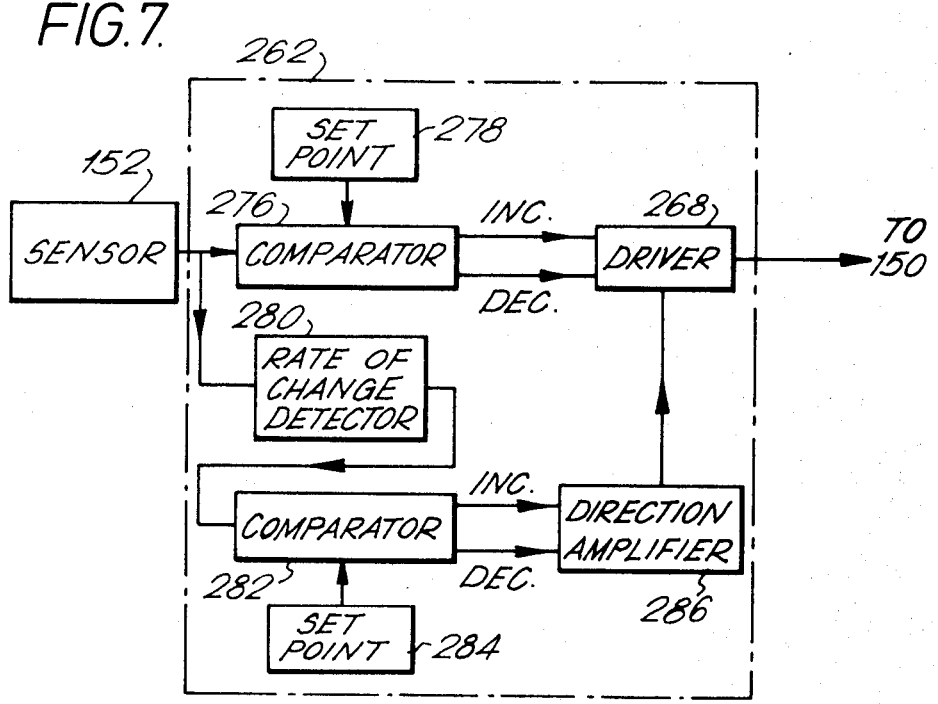
FIG. 7 shows a block diagram of a further embodiment of a programmer for use with an environmental control device of the air conditioning system.

FIG. 7 shows a block diagram of the circuit of an alternative embodiment of a programmer 262 which could be associated with one of the diffusion chambers 153. A similar programmer 262 could be provided for the other diffusion chamber 153. The programmer 262 is connected to receive the output signal from a single sensor 152 which may be either an infra-red sensor or an opacity sensor. The output from the programmer 262 is applied to the actuator 150 for adjustment of the throttle valve 156. With this embodiment, the fluid control valve 160 could be manually controlled, controlled by a programmer such as 162 or omitted. As shown, the programmer 262 has a first comparator 276 arranged to compare the magnitude of the output signal from the sensor 152 with a pre-set reference level from a level indicator 287. The two outputs from the comparator 276 are applied to a driver circuit 268 for the actuator 150 whereby the volume of air flow may be adjusted by the throttle valve 156 in dependence upon whether the output signal of the sensor 152 is greater than or less than the reference level. In addition, the output signal from the sensor 152 is fed to a rate of change detector circuit 280, the output of which is fed to a further comparator 282. The comparator 282 compares the rate of change of the output signal of the sensor 152 with a pre-set reference level from a level indicator 284. If a high rate of change of the output signal from the sensor 152 is detected the comparator 282 applies a signal to a direction amplifier 286 which applies a signal to the driver circuit 268 to operate the actuator 150 at a faster rate. Similarly, if a low rate of change is detected the comparator 282 applies a signal to the direction amplifier 286 which applies a signal to the driver circuit 268 to operate the actuator 150 at a slower rate. It will thus be seen that the circuit of FIG. 7 operates to control the air delivery device 123 in a similar manner to that described with reference to FIG. 6 and so the operation of FIG. 7 will not be further described. The programmer 262 is particularly useful with opacity sensors for quickly clearing clouds of fumes or steam by increasing the volume of air delivered to the working location.

The programmers 162 and 262 are only examples of the programming devices which might be used in conjunction with air conditioning systems of the present invention. It will be appreciated that the permutations of temperature and the volume of the air delivered are considerable. In some applications more sophisticated programmable control devices could be provided.

In some instances, it may be desirable to provide the air delivery device, such as 123, with more than two diffusion chambers so that several streams of air are delivered to a particular location, the temperature, volume and/or velocity of these streams being controlled independently of one another.

It will be seen from the embodiments described above that by providing infra-red sensors and opacity sensors the air at a working location can be kept both clean and at a suitable temperature. The air delivered to each working location may be varied in volume, in temperature, or both so that the air supply at each working location is specially controlled to meet the requirements at that location.

The method of distributing the air at each working location can also be varied and it may, for example, be desirable to vary the volume and velocity of the air delivered so as to achieve a particular pattern of air flow at a working location.

The air delivery pipe 14 might also have additional outputs which are not directed at working locations so that a supply of fresh clean air at the predetermined temperature is available to the building as a whole.

Although the invention has been described above, with particular reference to processes which generate heat, the air conditioning systems described can of course be used to condition the environment at other locations. Thus, the air conditioning system could be used at locations at which cold or freezing air is developed. For example, the system could be used to provide warm air to locations at which a freezing tunnel door is opened to expose a surface at a sub-zero temperature.

It will be seen that the air conditioning systems described above are able to vary the air supply in accordance with the demand of the particular processes and are capable of substantially instantaneous response to changing conditions at any of a variety of working locations. As the air conditioning systems described can respond to the process a far greater degree of diversity can be deployed and the air handling equipment is smaller, and therefore less energy consuming than traditional devices. It will be seen that the systems can be made completely automatic.

I claim:

1. An air conditioning system comprising sensor means for monitoring the environment at at least one location, said sensor means being arranged to produce an electrical output signal dependent upon the environment at said location; air delivery means including adjusting means for varying the flow of the air delivered in dependence upon the output signal from the sensor means; and a control circuit for said adjusting means, said control circuit comprising a first comparator having a first input connected to the output of said sensor means, a first reference level indicator connected to a second input of the first comparator, and a driver circuit having a first input connected to an output of the first comparator, said control circuit further comprising a rate of change detector connected to the output of said sensor means, a second comparator having a first input connected to the output of said detector, a second reference level indicator connected to a second input of said second comparator, and a direction amplifier connected to an output of the second comparator and to a second input of said driver circuit, said driver circuit being arranged to operate said adjusting means in dependence upon the output signal from said first comparator and the output signal from said direction amplifier.

2. A system according to claim 1, wherein said sensor means comprises one or more infrared thermometers.

3. A system according to claim 1, wherein said sensor means comprises one or more opacity sensors.

4. A system according to claim 1, wherein said sensor means comprises one or more hydrocarbon analyzers.

5. A system according to claim 1, wherein said air delivery means comprises a housing defining at least one air diffusion chamber therein, the housing having one wall facing said location, an inlet manifold connected for delivering air into said chamber in said housing, and a plurality of adjustable dampers mounted in an opening in said one wall whereby air can be delivered to said location through said opening and controlled by said dampers.

* * * * *